United States Patent [19]
Laor

[11] Patent Number: 6,041,309
[45] Date of Patent: *Mar. 21, 2000

[54] METHOD OF AND SYSTEM FOR DISTRIBUTING AND REDEEMING ELECTRONIC COUPONS

[75] Inventor: Raviv Laor, New York, N.Y.

[73] Assignee: OneClip.com, Incorporated, Atlanta, Ga.

[*] Notice: This patent is subject to a terminal disclaimer.

[21] Appl. No.: 09/220,414

[22] Filed: Dec. 23, 1998

Related U.S. Application Data

[63] Continuation-in-part of application No. 09/160,748, Sep. 25, 1998.

[51] Int. Cl.$^7$ ........................................... G06F 17/60
[52] U.S. Cl. .............................. 705/14; 705/26; 705/27; 705/28; 235/379
[58] Field of Search ................... 705/14, 28, 27, 705/1; 235/379

[56] References Cited

U.S. PATENT DOCUMENTS

| | | | |
|---|---|---|---|
| Re. 34,915 | 4/1995 | Nichtberger et al. | 364/401 |
| 4,674,041 | 6/1987 | Lemon et al. | 364/401 |
| 4,791,281 | 12/1988 | Johnsen et al. | 235/383 |
| 4,882,675 | 11/1989 | Nichtberger et al. | 364/401 |
| 5,117,355 | 5/1992 | McCarthy | 364/405 |
| 5,185,695 | 2/1993 | Pruchnicki | 364/401 |
| 5,193,056 | 3/1993 | Boes | 364/408 |
| 5,202,826 | 4/1993 | McCarthy | 364/405 |
| 5,237,499 | 8/1993 | Garback | 364/407 |
| 5,249,044 | 9/1993 | Von Kohorn | 358/86 |
| 5,287,268 | 2/1994 | McCarthy | 364/405 |
| 5,305,195 | 4/1994 | Murphy | 364/401 |
| 5,305,197 | 4/1994 | Axler et al. | 364/401 |
| 5,353,218 | 10/1994 | De Lapa et al. | 364/401 |
| 5,380,991 | 1/1995 | Valencia et al. | 235/383 |
| 5,420,606 | 5/1995 | Begum et al. | 345/156 |
| 5,502,636 | 3/1996 | Clarke | 364/401 |
| 5,515,098 | 5/1996 | Carles | 348/8 |
| 5,557,518 | 9/1996 | Rosen | 364/408 |
| 5,557,721 | 9/1996 | Fite et al. | 705/14 |
| 5,708,782 | 1/1998 | Larson et al. | 705/14 |
| 5,761,648 | 6/1998 | Golden et al. | 705/14 |
| 5,794,207 | 8/1998 | Walker et al. | 705/23 |
| 5,806,044 | 9/1998 | Powell | 705/14 |
| 5,884,278 | 3/1998 | Powell | 705/14 |
| 5,903,874 | 5/1999 | Leonard et al. | 705/14 |
| 5,905,673 | 6/1999 | Gregory | 705/14 |
| 5,970,469 | 10/1999 | Scroggie et al. | 705/14 |

*Primary Examiner*—Eric W. Stamber
*Assistant Examiner*—Romain Jeanty
*Attorney, Agent, or Firm*—McDermott Will & Emery

[57] ABSTRACT

The invention consists of a method and system for enabling and enhancing electronic commerce over a communications channel.

The system includes a communication channel coupled to at least two terminals having the ability to send and receive information. Where one terminal is deemed to be the client A, and the other terminal is deemed the server B. Upon receiving a request for information from the client A, the server B transfers the requested information. In addition to the requested information, the server B adds certain additional information either in the form of a coupon C (that can be enciphered), or in the form of a pointer to a coupon database, that allows the client A to be recognized by other servers B' not necessarily related to the server B, issuing the original information C. Any server(s) B' that subsequently recognizes client A as the client A makes requests for information to the new server(s) B' would only have the ability to recognize portions of the information C related to it. When client A makes certain electronic requests from server B', server B' will simultaneously make a request to a database on server D that will authenticate the information C that transpired between client A and server B'. Upon authentication and verification by server D, server B' will allow client A to proceed with any transactions and/or any request for information subject to other criteria of server B'.

28 Claims, 5 Drawing Sheets

METHOD OF AND SYSTEM FOR DISTRIBUTING AND REDEEMING ELECTRONIC COUPONS

CROSS-REFERENCE TO RELATED APPLICATIONS

This application is a continuation-in-part of copending U.S. patent application Ser. No. 09/160,748, filed Sep. 25, 1998.

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to a method of and system for distributing and redeeming electronic coupons or "tokens" in a computer network environment and more specifically to a method and system for distributing, in advance of a request for information for which the "token" has relevance which may be redeemed.

With the rapid growth of computer networking and requests for information from one computer to the next e.g. the Internet, it has become common practice for a provider of information (a "Server") to provide each specific requester of information (a "Client"), with an electronic "token" (commonly referred to as a "Cookie") for the purpose of "recognizing" the client and/or providing some pre-determined and pre-programmed level of customization at the discretion of the information provider.

Thus, in the prior art, the first time a client makes an electronic request for information from the server, the server delivers the requested information and, in addition, an electronic "token" or Cookie that allows the "server" to recognize the "client" and is able to customize the information provided in subsequent requests. The Cookie can also be used to identify a specific client or set of clients to control access to specific information or entry points of the server's private network.

In ordinary commerce, information providers such as newspapers and magazines are used to attract or identify specific market segments of consumers in order to permit vendors to target consumers in those specific market segments with advertising. This frequently includes the use of coupons which may be redeemed by consumers for discounts on product purchases and for other benefits. Typically, the source of the coupon is either the vendor's own product or publication or that of a distributor or other information provider associated with the vendor. One of the benefits of coupons is that they provide the vendor with some measure of the effectiveness of their advertising by using coupons that are unique to each source of advertising. However, the tracking of paper coupons is a very time consuming and imprecise process.

With the advance of the Internet, consumers can download and print out coupons from many online sources. Consumers can take these coupons to their local store to redeem them or return them to their source along with a proof of purchase in order to receive a refund by mail. These methods are both inconvenient and time consuming for the consumer. Currently, there is no effective way to distribute and redeem coupons online.

Accordingly, it is an object of this invention to provide an improved method and system for distributing and redeeming coupons in a network environment.

SUMMARY OF THE INVENTION

The invention is directed to a method of and system for distributing and redeeming electronic coupons in a networked environment where the source of the coupons, the consumer and vendor are all connected to a common communications channel. The consumer, via a client system, can connect to a source of the coupons, typically a server, which will transfer an electronic coupon or a "book" of electronic coupons to the client. These coupons are transferred in advance of the client establishing a connection with the vendor's server in order to request information or obtain discounts on purchases of the vendors products or services. When the client does establish a connection with a vendor's server and initiates a transaction for information, goods or services, the vendor's server can recognize that the client bears a coupon which can modify the transaction and permit the client to redeem the coupon. The coupon can include an encrypted or encoded portion which would permit the server to communicate with another server such as an authentication server to authenticate and/or validate the coupon.

The system according to the invention includes a first server system, including a computer processor and associated memory and a client system, including a computer processor and associated memory, coupled to a communications channel. The client system is adapted to request information from the first server system and the first server system is adapted for transferring information over the communications channel. The first server system is also adapted for transferring an electronic coupon to client system and the client system is adapted for storing the electronic coupon in the associated memory. The system can further include a second server system, including a computer processor and associated memory, coupled to the communications channel. The client can be adapted to initiate a transaction with the second server system. The second server system can be adapted to detect the electronic coupon in order to enable or modify the nature or value of the transaction. The system can further include a third server system, including a computer processor and associated memory, which can be coupled to the communications channel. The second server system can establish a connection with the third server system in order to enable the third server system to authenticate the electronic coupon and authorize the completion of the transaction contemplated.

In another embodiment, the first server system may be adapted for transferring an electronic token to the client system and the client system may be adapted for storing the electronic token in the associated memory. In this embodiment, all of the data relating to the coupon resides on a separate server system, and the electronic token includes pointer information pointing to the coupon data on the separate server system.

In another embodiment, the first server system may include script necessary to form a first website frame having a predetermined signature. The first server system provides an electronic token to the client system such that the electronic token uniquely corresponds to the predetermined signature. In this embodiment, the second server system also includes script necessary to form a second website frame having the same predetermined signature as the first website frame, such that the second server system may retrieve the electronic token deposited by the website frame. The electronic token may include the complete body of coupon information, or the electronic token may only include data identifying the client and pointing to coupon information associated with the client and residing on a separate server system.

The method according to the invention includes the steps of a client system requesting information from a first server system. The first server system transfers the requested information and includes an electronic coupon along with the information transferred. The client system stores the electronic coupon in memory. The client system subsequently requests information from a subsequent server system. The subsequent server system can detect that the client system holds the electronic coupon and upon initiation of a transaction with the subsequent server system, the subsequent server system can enable or modify the transaction, such as by providing a discount in the purchase price of goods or services or provide access or a modified level of access to the information requested as a function of the electronic coupon.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention is directed to a method of and system for distributing and redeeming electronic coupons. An electronic coupon is essentially a token, issued by or under the authority of the issuer for the benefit of recipient. Typically, the recipient receives the electronic coupon and subsequently redeems it for the prescribed benefit at some later point in time. Preferably, the electronic coupon enables or modifies an anticipated transaction such as providing a discount in the price of goods or services provided by the issuer or the issuer's agent. In addition, the electronic coupon can enable or modify the level of access to privately held information or a server having restricted access. Alternatively, the electronic coupon can be used in transactions between two businesses, two government agencies or two governments wherein, for example, the businesses enter into an agreement relating to a transaction for goods or services or access to information, or the governmental bodies enter into an agreement relating to transactions regarding currency or information. Although the distribution of electronic coupons may be selectively tailored to particular users based upon the users' demographics, shopping and spending habits, etc., a preferred embodiment of the invention distributes coupons to users independent of any known characteristics of the recipient.

Figure 1:
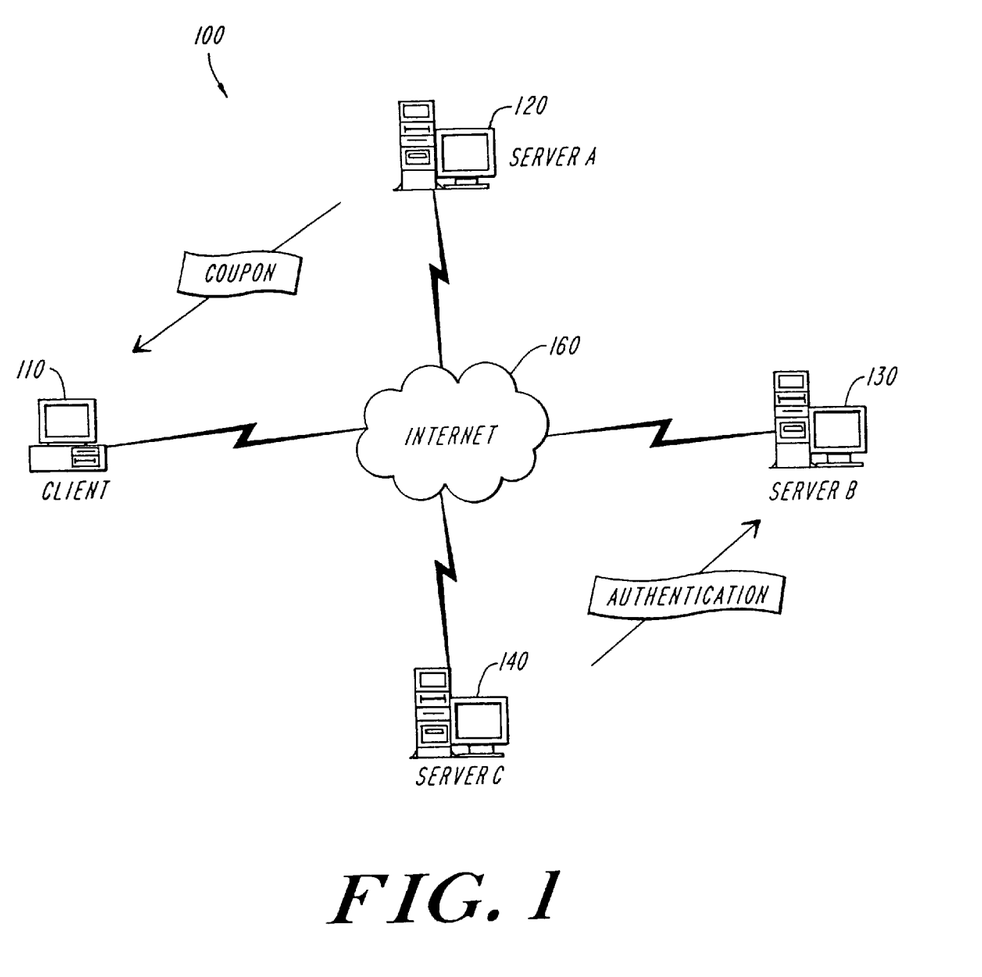
FIG. 1 is a diagrammatic view of a system for distributing and redeeming electronic coupons in accordance with the present invention.

FIG. 1 shows a diagram of a system 100 for distributing and redeeming electronic coupons in accordance with a preferred embodiment of the present invention. The system 100 includes Client system 110, Server System A 120, Server System B 130, and Server System C 140, all connected to a common communications channel 160. Preferably, the Client system 110, Server System A 120, Server System B 130, and Server System C 140 can be a personal computer such as an IBM PC or IBM PC compatible system or an APPLE MacINTOSH system or a more advanced computer system such as an Alpha based computer system available from the Digital Equipment Corporation division of Compaq Computer Corporation or SPARC Station computer system available from SUN Microsystems Corp, although a main frame computer system can also be used. Preferably, the communications channel 160 is a TCP/IP based network such as the Internet or an intranet, although almost any well known LAN, WAN, VPN technology can be used.

In one preferred embodiment of the invention, the Client system 110 is an IBM PC compatible operating the Microsoft Windows 95 or 98 operating system and Server System A 120, Server System B 130, and Server System C 140 are configured as Web Servers providing access to information such as web pages in HTML format via the HyperText Transport Protocol (http). Server System A 120 is also configured to generate cookies and to transfer the cookies to the Client System 110. The Client system 110 includes software to allow viewing of web pages, commonly referred to as a Web Browser, such as Communicator available from Netscape Communications Corp. or Internet Explorer available from Microsoft Corp. The Client system 110 is capable of accessing web pages located on Server System A 120 and Server System B 130. Server System C 140 is an authentication server which includes the software necessary to authenticate electronic coupons prior to their redemption.

In one preferred embodiment, Service System A 120 includes web server software that is adapted to produce an electronic coupon or a book of electronic coupons that is transferred to the Client system 110 in the form of a Cookie that is stored in memory at the Client system. Preferably, the electronic coupon is a data structure which can include any or all of the following information elements: data representative of an electronic coupon serial number or identification number, data representative of a unique key that can be used to validate or authenticate the coupon, data representative of the vendor that authorized the coupon and will redeem the coupon, data representative of the nature of the discount or access provided by the coupon, data representative of the server or entity that issued the coupon. In one preferred embodiment, the electronic coupon can be issued as part of an electronic coupon book. The coupon book can include data representative of a version number for the electronic coupon book and data representative of a serial number or identification number for the electronic coupon book.

In one preferred embodiment, the electronic coupon contains all the information necessary to redeem the coupon. Specifically, the electronic coupon identifies the grantor (i.e. the party or vendor that will redeem the electronic coupon), the nature of the discount or benefit provided and a unique serial number or other data structure that permits the electronic coupon to be authenticated or validated. Thus, a server redeeming this type of electronic coupon can obtain all the information necessary to redeem from the electronic coupon. The server can even include the software necessary to authenticate or validate the electronic coupon.

In an alternative embodiment, the electronic coupon book includes a unique serial number or identification number and a data structure useful for authenticating or validating the electronic coupon book. The actual content of the electronic coupon book can be determined, for example, by visiting a website which reads the coupon book serial number and provides the user with listing of the coupons available. A benefit to this configuration is the organization that issues the electronic coupon book can add vendors even after the electronic coupon book has been issued. Thus, if a vendor signs up with the organization that issues electronic coupon books after a particular coupon book has been issued to a client, the vendor can be added to the electronic coupon book at a later date. In order to redeem this type of electronic coupon, the server that intends to redeem the electronic coupon must connect to an authentication server which will authenticate or validate the coupon book and indicate the nature of the benefit of the electronic coupon to the server requesting authentication/validation. Another benefit of this configuration is that the coupons are relatively tamper proof, due to the authentication and validation facilities. In many prior art systems, coupons could be copied and/or altered by the user with relative ease; in the absence of validation/authentication schemes, few reliable methods for detection of such counterfeits exist.

In another embodiment, all of the information embodied in the coupon (i.e., nature of benefit, authentication data, grantor data, valid vendors, etc.) may reside on a separate "clearing house" server, such that the Cookie held by the Client system 110 merely conveys identifying information relating to the Client that points to the coupon on the clearing house server. In this embodiment, a Client "receiving" a coupon results in a modification of the clearing house server database rather than a modification of data on the Client system; i.e., the Client system never physically receives the coupon. This embodiment requires communication between the server issuing the coupon and the clearinghouse server, via internet, conventional telephone line or other suitable communications channel. Likewise, when the coupon is to be redeemed by the Client system 110, the redeeming server must establish a link to the clearinghouse server for identification, validation and authentication. In an alternate embodiment, the coupon or coupons residing on the clearinghouse server may be provided to a printing device peripheral to the clearinghouse server, such that hard-copy versions of the coupons may be mailed, sent via facsimile, or otherwise delivered to the Client system 110.

Figure 2:
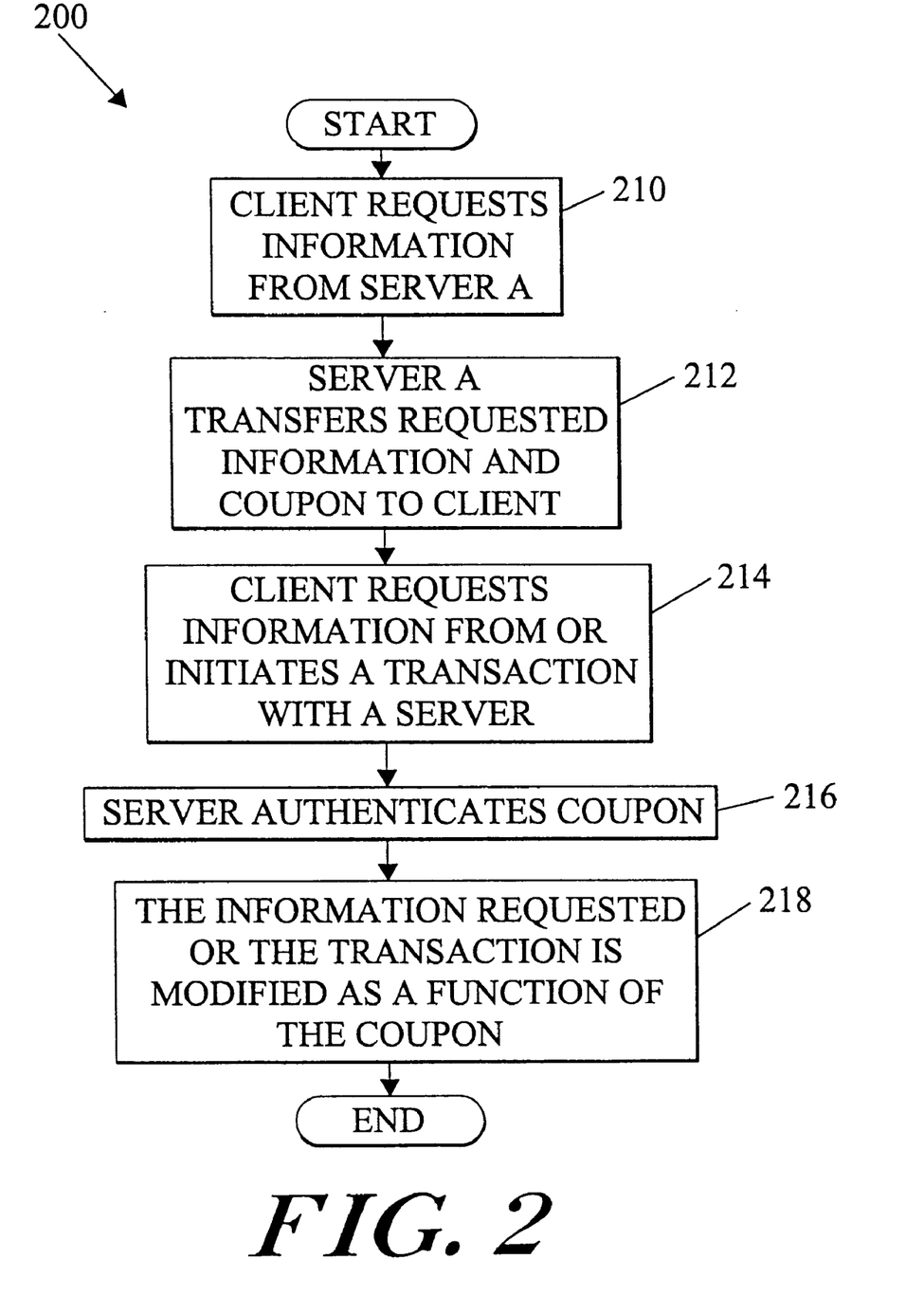
FIG. 2 is a flow diagram of a method of distributing and redeeming electronic coupons in accordance with the present invention.

FIG. 2 shows a flow chart 200 of a method of distributing and redeeming coupons in accordance with one preferred embodiment of the invention. In a preliminary step 210, the client system requests information from Server A. In the next step 212, Server A transfers the requested information along with the electronic coupon to the Client system. The Client system stores the electronic coupon in memory. In the next step 214, the Client system initiates a transaction or requests information from a Server. The Server could be Server A or another server. At this point, depending upon the system, the Server could detect the presence of the electronic coupon on the Client system or the Client system could present the electronic coupon for redemption. In the next step 216, the Server authenticates the electronic coupon. Depending upon the system, the Server could evaluate the electronic coupon to authenticate or validate the electronic coupon, or alternatively, the Server could transfer the electronic coupon information to an Authentication Server which could authenticate or validate the electronic coupon and authorize the transaction. In the next step 218, the electronic coupon is used to modify or enable the transaction and the transaction is completed.

As one of ordinary skill will appreciate, it will not always be necessary for the Client system to request information from Server A. All that is necessary is for Server A to establish a connection with the Client system in order to transfer the electronic coupon to the Client system. One method of transferring the electronic coupon is to include the electronic coupon with the information requested. Alternatively, the electronic coupon can be transferred to the Client system by any method of transferring information.

In a preferred embodiment of the invention, the Client system is a personal computer running browser software which connects to web servers via the Internet or a similar network. Preferably, a book of electronic coupons is transferred to the Client system in the form of a Cookie which is stored in memory at the Client system. The Cookie can be detected by any subsequent web server that Client system connects to. If the Client system attempts to initiate a transaction with a particular web server, the web server detects the Cookie which includes electronic coupon and uses the electronic coupon to enable or modify the transaction. In this embodiment, when the Client system receives the electronic coupon, the user can be alerted to the presence of the electronic coupon by another browser window or a java based window that identifies all the electronic coupons in the electronic coupon book, the nature of the benefit provided and provides links to the various web sites where the electronic coupons can be redeemed. Alternatively, the Client system can connect to a web server which displays the contents of the electronic coupon book in the form of a web page which describes the nature of the electronic coupon benefit and a link to the web page where the electronic coupon can be redeemed. In yet another embodiment of the invention, when the Client system receives the electronic coupon or coupon book, the Client system may be programmed to automatically provide the electronic coupon or coupon book to a peripheral printing device such that the User has automatic access to hard-copy versions of the coupons.

As one having ordinary skill in the art will appreciate, the use of the client system will typically be operated or otherwise controlled by a consumer or a customer (in business to business transactions) and the server system or systems will be operated or otherwise controlled by an organization or an agent of an organization authorized to enter into and complete the transaction. In addition, as one having ordinary skill will appreciate the entire process and system can be automated, for example whereby a client system is programmed to periodically visit websites (whether or not known to the source of electronic coupons) or the originating server can be programmed to periodically distribute electronic coupons, such as by electronic mail, and the redeeming server can be programmed to automatically redeem the electronic coupon as part of an automated request to initiate a transaction received from an automated client system. One of ordinary skill in the art will also appreciate that the electronic coupons can include an expiration date or a window of dates when the electronic coupon is valid or effective.

In another embodiment of the invention, Cookies are transferred to, or retrieved from, a client system by a frame spawned within a primary website by JavaScript or other similar software code. This embodiment is compatible with security features included with some web browsers that limit a website to depositing and retrieving Cookies only for itself. For example, a user visiting a highly trafficked website generally receives a Cookie from that site, but a user cannot receive a cookie from a site on behalf of another site. This is because a Cookie deposited by a particular website is encoded with a signature corresponding to that website, and the browser utilizes that signature to limit Cookie transfers to only the website that created the Cookie. However, a frame spawned within the highly trafficked website can deposit a Cookie on the Client system, and a similar frame spawned within another website can subsequently read that Cookie, as long as the frames spawned on different websites look the same (i.e., have the same signature) to the browser running on the Client system. As with the other embodiments described herein, the Cookie may contain all of the necessary the coupon information, including the complete coupon data structure necessary for benefits identification, validation and authentication, or the Cookie may contain only data identifying the Client, so that the Cookie functions as a pointer to a database on a coupon clearinghouse server. If the Cookie contains the complete data structure, the script will include the code necessary to authenticate and validate the coupon. The utility of this embodiment lies in the fact that the issuer and the redeemer of the coupon need not be the same entity. For example, a producer of goods may desire to have coupons distributed to potential purchasers, but may not desire to conduct the electronic commerce necessary to redeem the coupons. In this case, the producer of goods would distribute the JavaScript (or other similar script) for generating coupon-distributing website frames to highly trafficked websites. The producer of goods would also provide the frame-generating script to point-of-sale product retailers so that the coupons could be redeemed where the product is sold. In other embodiments of the invention, the highly trafficked advertising website and the point of sale, redeeming website may be the same website. In other embodiments, the website from which the user acquires coupons or coupon pointer information may include the clearinghouse system directly, i.e., the user need not visit a website separate from the clearinghouse.

Figure 3:
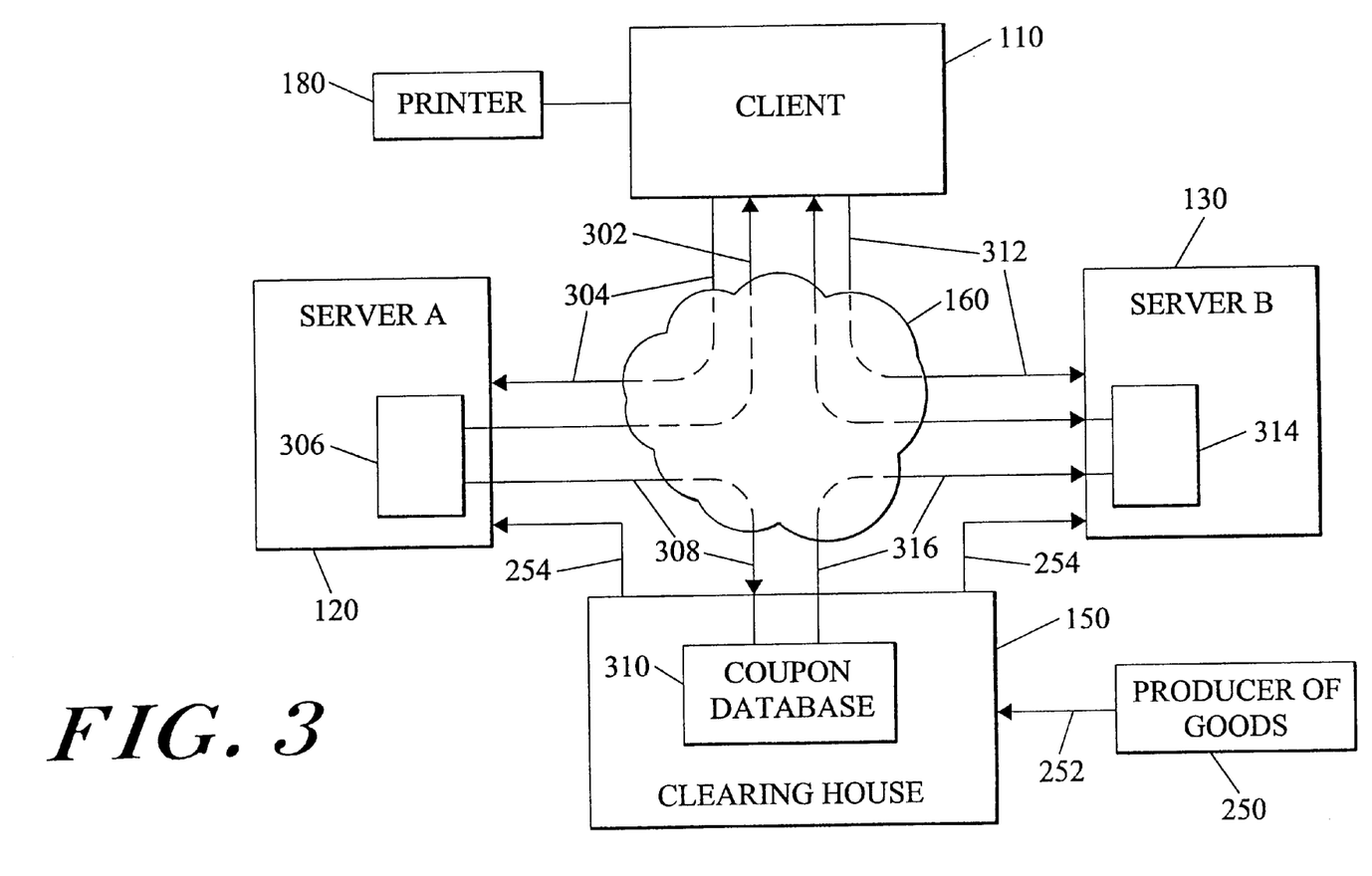
FIG. 3 is a diagrammatic view of another embodiment of the system of FIG. 1.
Figure 4:
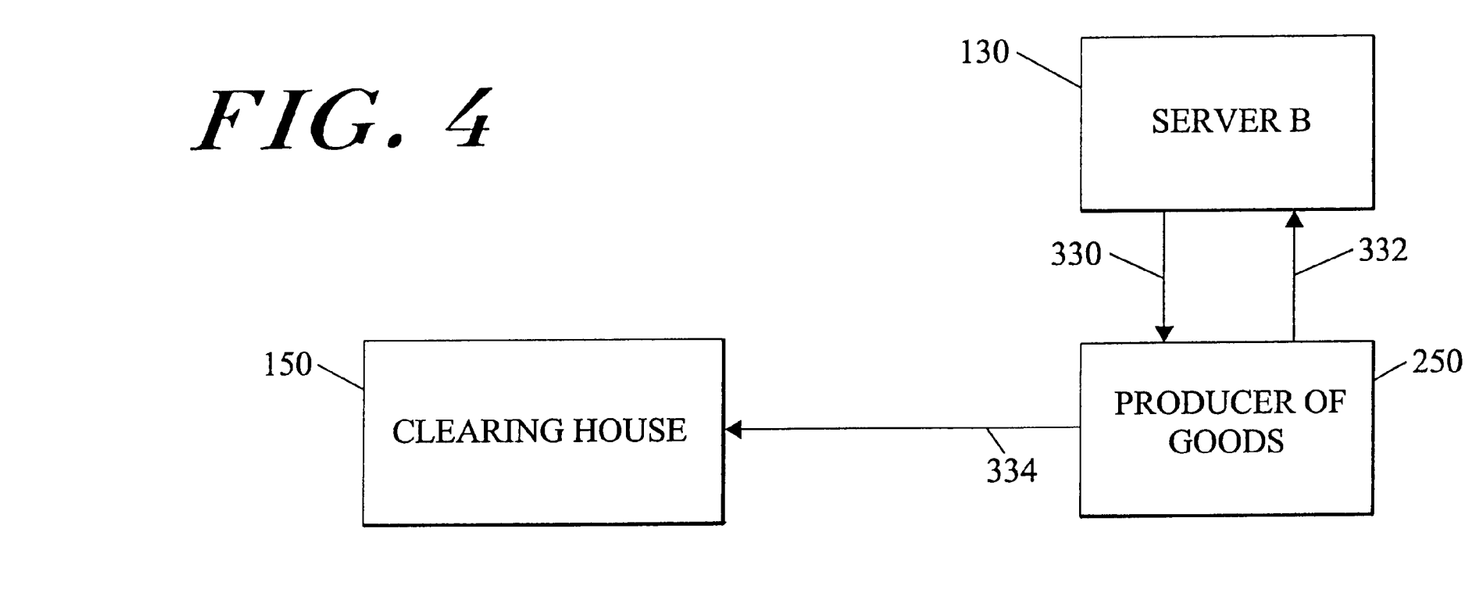
FIG. 4 is a diagrammatic view of the reimbursement procedure of one embodiment of the system of FIG. 3; and, FIG. 5 is a diagrammatic view of the reimbursement procedure of another embodiment of the system of FIG. 3.
Figure 5:
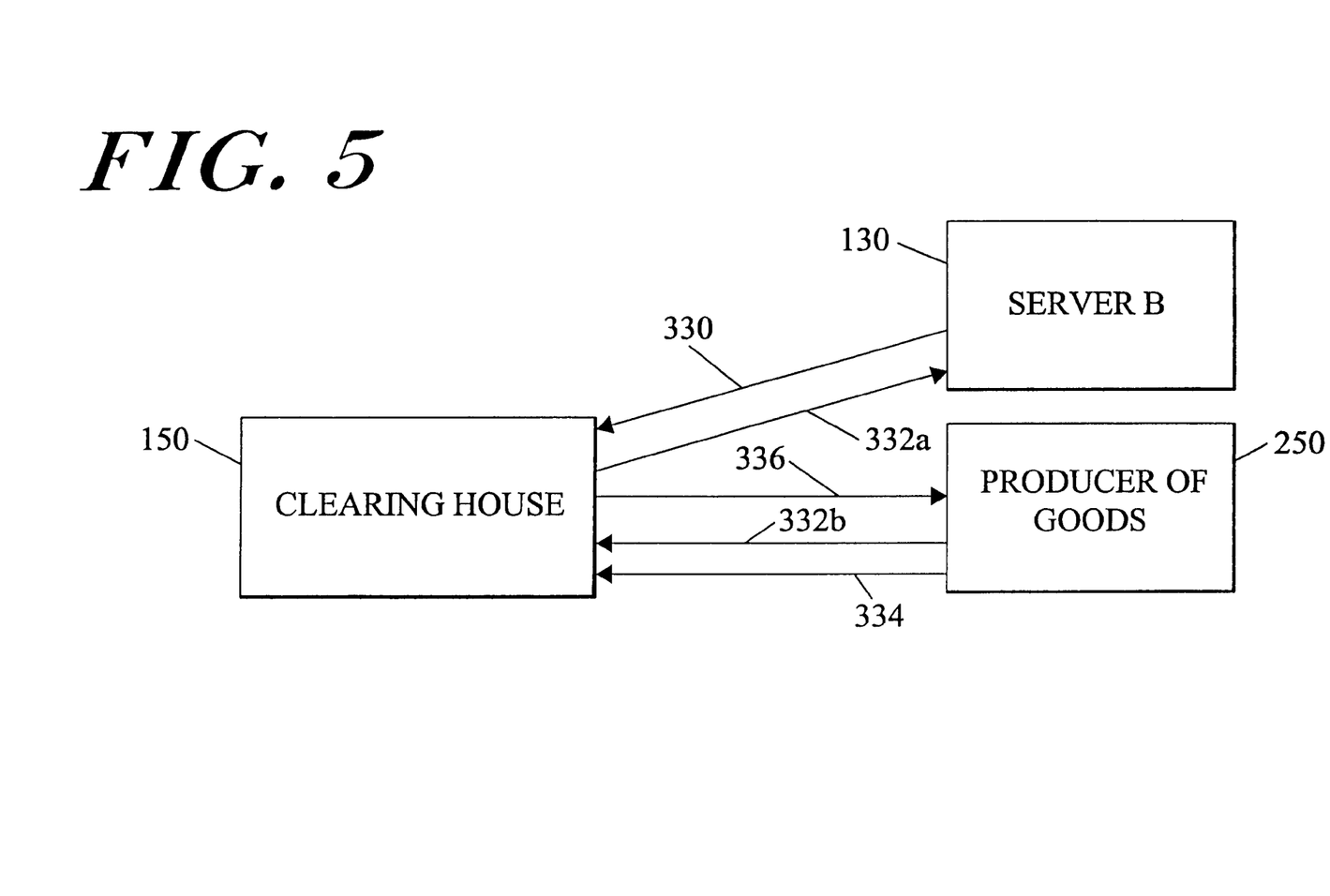

The preceding embodiment of the invention may be implemented by a single service provider such as the entity responsible for the coupon clearinghouse server 150. In this scenario, illustrated in FIG. 3, the producer of goods 250 authorizes 252 the clearinghouse 150 to generate and distribute electronic coupons related to the relevant goods. The clearinghouse 150 produces and distributes the necessary frame-generating script 254 to the highly trafficked websites (i.e., the advertising websites) and to the point of sale websites (the coupon redeeming websites). A user operating a Client system 110 initiates a connection 302 to the one of the advertising websites (Server A 120) and receives a Cookie 304 from the frame 306 spawned by the script. If the coupon is to be stored on a clearinghouse database, the advertising website establishes a connection 308 to the clearinghouse 150 to store coupon information associated with the Client 110 into the clearinghouse coupon database 310. In a preferred embodiment of the invention, the aforementioned distribution of coupons is not dependent upon any characteristics of the Client 110 (e.g., demographics, purchasing habits etc.), although other embodiments may utilize such information to selectively distribute particular coupons to specific Clients. The user subsequently initiates a connection 312 to one of the coupon redeeming websites (Server B 130), and the frame 314 spawned by the resident script retrieves the Cookie that contains either the complete coupon data structure or the Client data that points to the clearinghouse database. If the coupon has been stored on the clearinghouse database 310, the redeeming website 130 establishes a communications link 316 to the clearinghouse 150 and retrieves coupon information associated with the Client 110. The redeeming website 130 then authenticates the coupon, either internally based on the information embedded in the coupon, or via the connection 316 to the clearinghouse 150. The redeeming website 130 then modifies the transaction with the Client 110 by an amount defined by the coupon. As with conventional paper-based coupons, the redeeming entity (corresponding to the redeeming website 130) is reimbursed for the amount of the transaction modification in addition to a processing fee. The redeeming entity 130 may receive the reimbursement and fee from the producer of goods 250 directly, or from the clearinghouse 150. In the former case (shown in FIG. 4), upon notification 330 of the transaction from the redeeming entity 130, the redeeming entity receives the reimbursement and fee 332 from the producer of goods 250, and the clearinghouse 150 receives a fee 334 from the producer of goods 250 for each coupon redeemed. In the latter case (shown in FIG. 5), upon notification from the redeeming entity 130, the redeeming entity 130 receives the reimbursement and fee 332a from the clearinghouse, the clearinghouse notifies the producer of goods of the transaction, and the producer of goods reimburses the clearinghouse for the amount of the modification and the fee 332b that the clearinghouse paid to the redeeming entity, in addition to a providing a fee 334 to the clearinghouse for the redeemed coupon.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for distributing and redeeming electronic coupons comprising:

a first server system including a computer processor and associated memory, said first server system being connected by a communications channel to a client system, said first server system being adapted for transmitting an electronic coupon to said client system over said communications channel, without regard to predetermined client criteria;

said client system including a computer processor and associated memory, said client system being adapted for storing said electronic coupon in said memory; and, a second server system connected to said communications channel, said second server system being adapted to establish a connection with said client system and for detecting said electronic coupon stored on said client system, said second server system further being adapted to redeem said electronic coupon.

2. A system according to claim 1 further comprising:

a third server system connected to said communications channel, said third server system being adapted for communicating with said second server system and for authorizing the redemption of said electronic coupon.

3. A system according to claim 1 wherein said second server system is adapted to redeem said coupon as a function of a transaction initiated between said client system and said second server system.

4. A system according to claim 1 wherein said second server system is adapted to redeem said coupon by modifying a transaction initiated between said client system and said second server system.

5. A system according to claim 1 wherein said communications channel includes a network.

6. A system according to claim 1 wherein said communications channel includes a TCP/IP based network and said coupon includes a cookie.

7. A system according to claim 1 wherein said first server system and said second server system are the same server system.

8. A system for distributing and redeeming electronic coupons comprising:

a first server system including a computer processor and associated memory, said first server system being connected by a communications channel to a client system, said first server system including means for associating an electronic coupon with said client system and for providing an electronic token to said client system without regard to predetermined client criteria, said token having a data structure associating said client system with said electronic coupon;

said client system including a computer processor and associated memory, said client system being adapted for receiving and storing said electronic token in said memory; and, retrieval means for establishing a connection with said client system, for detecting and retrieving said electronic token stored on said client system, and for redeeming said electronic coupon.

9. A system according to claim 8, wherein said data structure includes data necessary for redemption and identification of a corresponding source and benefit, including at least data representative of a version number of said electronic coupon, data representative of a vendor capable of redeeming said electronic coupon, and data representative of a serial number identifying said electronic coupon.

10. A system according to claim 8, wherein said electronic coupon resides on a distinct server system, and said data structure includes data pointing to said coupon.

11. A system according to claim 8, wherein said retrieval means includes a second server system connected to said communications channel.

12. A system according to claim 11, wherein (i) said first server system further includes a script for generating a website frame having a predetermined signature, such that said electronic token uniquely corresponds to said predetermined signature; and, (ii) said second server system further includes said script for generating said website frame having said predetermined signature.

13. A system according to claim 11 further comprising:

a third server system connected to said communications channel, said third server system including means for communicating with said second server system and for identifying and authorizing the redemption of said electronic coupon.

14. A system according to claim 11 wherein said second server system includes means for redeeming said coupon as a function of a transaction initiated between said client system and said second server system.

15. A system according to claim 11 wherein said second server system includes means for redeeming said coupon by modifying a transaction initiated between said client system and said second server system.

16. A system according to claim 8, wherein said retrieval means includes said first server system, whereby said means for assigning and said retrieval means are implemented by a single server system.

17. A system according to claim 8, wherein said coupon includes information representative of at least one aspect of a transaction.

18. A system according to claim 17, wherein said at least one aspect of a transaction includes one or more of the following: identification of goods or services, source of goods or services, price of goods or services, and discount from goods or services.

19. A system according to claim 8, further including printing means for automatically providing a hard-copy document corresponding to said electronic coupon.

20. A system according to claim 8, further including means for authenticating and validating said electronic coupon prior to redeeming said coupon so as to substantially prevent unauthorized tampering with said coupon.

21. A system according to claim 20, wherein said means for authenticating is selected from the group consisting of version number analysis, serial number analysis, identification number analysis, encryption/decryption, and combinations thereof.

22. A method of distributing and redeeming an electronic coupon comprising the steps of:

A) establishing a connection over a communications channel between a client and a server;

B) transferring said electronic coupon from said server to said client without regard to predetermined client criteria;

C) establishing a connection over a communications channel between said client and a subsequent server, said subsequent server including one of said server and other servers;

D) said client requesting information from said subsequent server;

E) said subsequent server recognizing said electronic coupon; and,

F) said subsequent server redeeming said electronic coupon as a function of a transaction initiated between said client and said subsequent server.

23. A method of distributing and redeeming an electronic coupon according to claim 22, wherein prior to step A, the server receives a request for information from the client.

24. A method of distributing and redeeming an electronic coupon according to claim 22, further comprising the step of:

authenticating said electronic coupon and authorizing a transaction between said client and subsequent server as a function of an authenticated electronic coupon.

25. A method of distributing and redeeming an electronic coupon according to claim 22, further comprising the steps of:

establishing a connection between said subsequent server and an authentication server; and, said authentication server authenticating said electronic coupon and authorizing the redemption of said electronic coupon.

26. A method of distributing and redeeming an electronic coupon comprising the steps of:

A) establishing a connection over a communications channel between a client and a server;

B) associating said electronic coupon with said client without regard to predetermined client criteria;

C) establishing a connection over a communications channel between said client and a subsequent server, said subsequent server including one of said server and other servers;

D) said client requesting information from said subsequent server;

E) said subsequent server recognizing said electronic coupon; and,

F) said subsequent server redeeming said electronic coupon as a function of a transaction initiated between said client and said subsequent server.

27. A method of distributing and redeeming an electronic coupon according to claim 26, further comprising the step of:

prior to step B, generating, on said server, a first website frame having a predetermined signature such that an electronic token provided by said website frame to said client uniquely corresponds to said predetermined signature, said token having a data structure including at least data pointing to said electronic coupon; and, prior to step E, generating, on said subsequent server, a second website frame having said predetermined signature, such that said second website frame can access said electronic token.

28. A system for distributing electronic coupons comprising:

a first server system including a computer processor and associated memory, said first server system being connected by a communications channel to a client system, said first server system being adapted for associating an electronic coupon with said client system and for providing an electronic token to said client system without regard to predetermined client criteria, said token having a data structure including at least data pointing to said electronic coupon;

said client system including a computer processor and associated memory, said client system being adapted for receiving and storing said electronic token in said memory, such that in a subsequent network transaction said electronic coupon may be detected by a second server and utilized to modify said subsequent network transaction.

* * * * *